(12) United States Patent
Segev et al.

(10) Patent No.: US 12,379,873 B2
(45) Date of Patent: Aug. 5, 2025

(54) FAST EXECUTION OF BARRIER COMMAND

(71) Applicant: Western Digital Technologies, Inc., San Jose, CA (US)

(72) Inventors: Amir Segev, Meiter (IL); Shay Benisty, Beer Sheva (IL); Rotem Sela, Sunnyvale, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 55 days.

(21) Appl. No.: 18/351,318

(22) Filed: Jul. 12, 2023

(65) Prior Publication Data

US 2024/0143228 A1     May 2, 2024

Related U.S. Application Data

(60) Provisional application No. 63/421,250, filed on Nov. 1, 2022.

(51) Int. Cl.
G06F 3/06     (2006.01)

(52) U.S. Cl.
CPC .......... G06F 3/0659 (2013.01); G06F 3/0611 (2013.01); G06F 3/0673 (2013.01)

(58) Field of Classification Search
CPC .... G06F 3/0611; G06F 3/0659; G06F 3/0673; G06F 3/0679; G06F 3/0656; G06F 3/065
USPC .................................................. 711/154, 163
See application file for complete search history.

(56) References Cited

U.S. PATENT DOCUMENTS

| | | | |
|---|---|---|---|
| 9,122,401 B2 | 9/2015 | Zaltsman et al. | |
| 10,162,534 B1 | 12/2018 | Obr | |
| 2014/0033209 A1 | 1/2014 | Lih et al. | |
| 2014/0059270 A1 | 2/2014 | Zaltsman et al. | |
| 2014/0068626 A1* | 3/2014 | Koker | G06F 9/50 718/104 |
| 2014/0331001 A1* | 11/2014 | Liu | G06F 3/0659 711/103 |
| 2015/0033234 A1 | 1/2015 | Shacham et al. | |
| 2018/0089881 A1* | 3/2018 | Johnson | G06F 9/45558 |
| 2019/0220404 A1 | 7/2019 | Hwang | |
| 2020/0125263 A1 | 4/2020 | Walker et al. | |

(Continued)

OTHER PUBLICATIONS

International Search Report and Written Opinion for Application No. PCT/US2023/075881 dated Feb. 13, 2024.

*Primary Examiner* — Hashem Farrokh
(74) *Attorney, Agent, or Firm* — PATTERSON + SHERIDAN, LLP

(57) ABSTRACT

The present disclosure generally relates to read and write operations utilizing barrier commands. Using barrier commands and a snapshot of doorbell states of submission queues (SQs), the necessary write commands to perform a read may be identified and executed to reduce any wait time of the host. As such, host delays during reads and writes are reduced. In absence of a barrier command, the host needs to wait for writes to complete before performing a read. When a barrier command is used, the host needs to wait for the barrier command to complete before performing a read. The controller will execute the post barrier reads only after completing the pre-barrier writes. As will be discussed herein, the controller completes the barrier command as soon as a doorbell snapshot is taken even though the pre-barrier writes may not yet be completed.

18 Claims, 8 Drawing Sheets

(56) References Cited

U.S. PATENT DOCUMENTS

2020/0333975 A1   10/2020  Benisty
2021/0132968 A1*  5/2021  Li .................... G06F 9/30043
2022/0092002 A1   3/2022  Yasufuku
2023/0102089 A1*  3/2023  Bellubbi ............ G06F 11/0757
                                               714/55

* cited by examiner

FAST EXECUTION OF BARRIER COMMAND

CROSS-REFERENCE TO RELATED APPLICATIONS

This application claims benefit of U.S. Provisional Patent Application Ser. No. 63/421,250, filed Nov. 1, 2022, which is herein incorporated by reference.

BACKGROUND OF THE DISCLOSURE

Field of the Disclosure

Embodiments of the present disclosure generally relate to reading and writing operations utilizing barrier commands.

Description of the Related Art

In non-volatile memory (NVM) systems, the NVM express (NVMe) 2.0 specification states "Except for fused operations, there are no ordering restrictions for processing of commands within or across Submission Queues. Host software should not submit commands to a Submission Queue that may not be re-ordered arbitrarily. Data associated with the processing of a command may or may not be committed to the NVM subsystem non-volatile memory storage medium in the order that commands are submitted."

During read and write operations, a host must wait to perform read operations until all write operations are completed to ensure reading the most updated data. The host must wait because the NVMe 2.0 specification states that host software should not submit commands to a submission queue that may not be re-ordered arbitrarily. Hence, the host system should delay command execution which creates inefficiencies. Additionally, the host has to either implement a command tracking function to identify the commands needed to be completed or wait for a full flush of the submission queues.

Barrier commands may be used to inform the host of write completions to trigger read commands. However, barrier commands alone still result in the host having to delay.

Therefore, there is a need in the art for acceleration of barrier commands.

SUMMARY OF THE DISCLOSURE

The present disclosure generally relates to reading and writing operations utilizing barrier commands. During reading and writing, a host must wait to perform read operations until after write operations are completed to ensure reading the most updated data. The host waits because the NVMe 2.0 specification requires that data submitted to submission queues (SQs) may be written in arbitrary order. Using barrier commands and a snapshot of doorbell states of SQs, the necessary write commands to perform a read may be identified and executed to reduce any wait time of the host. As such, host delays during reads and writes are reduced. In absence of a barrier command, the host needs to wait for writes to complete before performing a read. When a barrier command is used, the host needs to wait for the barrier command to complete before performing a read. The controller will execute the post barrier reads only after completing the pre-barrier writes. As will be discussed herein, the controller completes the barrier command as soon as a doorbell snapshot is taken even though the pre-barrier writes may not yet be completed.

In one embodiment, a data storage device comprises: a memory device; and a controller coupled to the memory device, wherein the controller is configured to: fetch a barrier command; capture a snapshot of doorbell states of pre-barrier commands in at least one submission queue (SQ); inform a host device of completion of the barrier commands; and receive a new command, wherein the new command is to be completed after the pre-barrier commands.

In another embodiment, a data storage device comprises: a memory device; and a controller coupled to the memory device, wherein the controller is configured to: detect one or more barrier commands; initialize a first value counter to 0; capture a snapshot of current doorbell values of pre-barrier commands of one or more submission queues (SQs); determine a difference between a second value counter and the current doorbell value for the one or more submission queues; store the difference as a third value counter; add the third value counter to the first value counter; execute the one or more barrier commands; and inform a host device of barrier command completion.

In another embodiment, a data storage device comprises: memory means; and a controller coupled to the memory means, wherein the controller is configured to: receive one or more barrier commands; capture a snapshot of doorbell states of one or more submission queues (SQs); update value counters in response to the snapshot; modify a weighted round robin (WRR) arbitration scheme to ensure commands in the one or more SQs that arrived before a barrier command of the one or more barrier commands are completed before commands that arrived after a barrier command of the one or more barrier commands; execute the barrier command; and inform a host system of the barrier command completion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reading and writing operations utilizing barrier commands. During reading and writing, a host must wait to perform read operations until after write operations are completed to ensure reading the most updated data. The host waits because the NVMe 2.0 specification requires that data submitted to submission queues (SQs) may be written in arbitrary order. Using barrier commands and a snapshot of doorbell states of SQs, the necessary write commands to perform a read may be identified and executed to reduce any wait time of the host. As such, host delays during reads and writes are reduced. In absence of a barrier command, the host needs to wait for writes to complete before performing a read. When a barrier command is used, the host needs to wait for the barrier command to complete before performing a read. The controller will execute the post barrier reads only after completing the pre-barrier writes. As will be discussed herein, the controller completes the barrier command as soon as a doorbell snapshot is taken even though the pre-barrier writes may not yet be completed.

Figure 1:
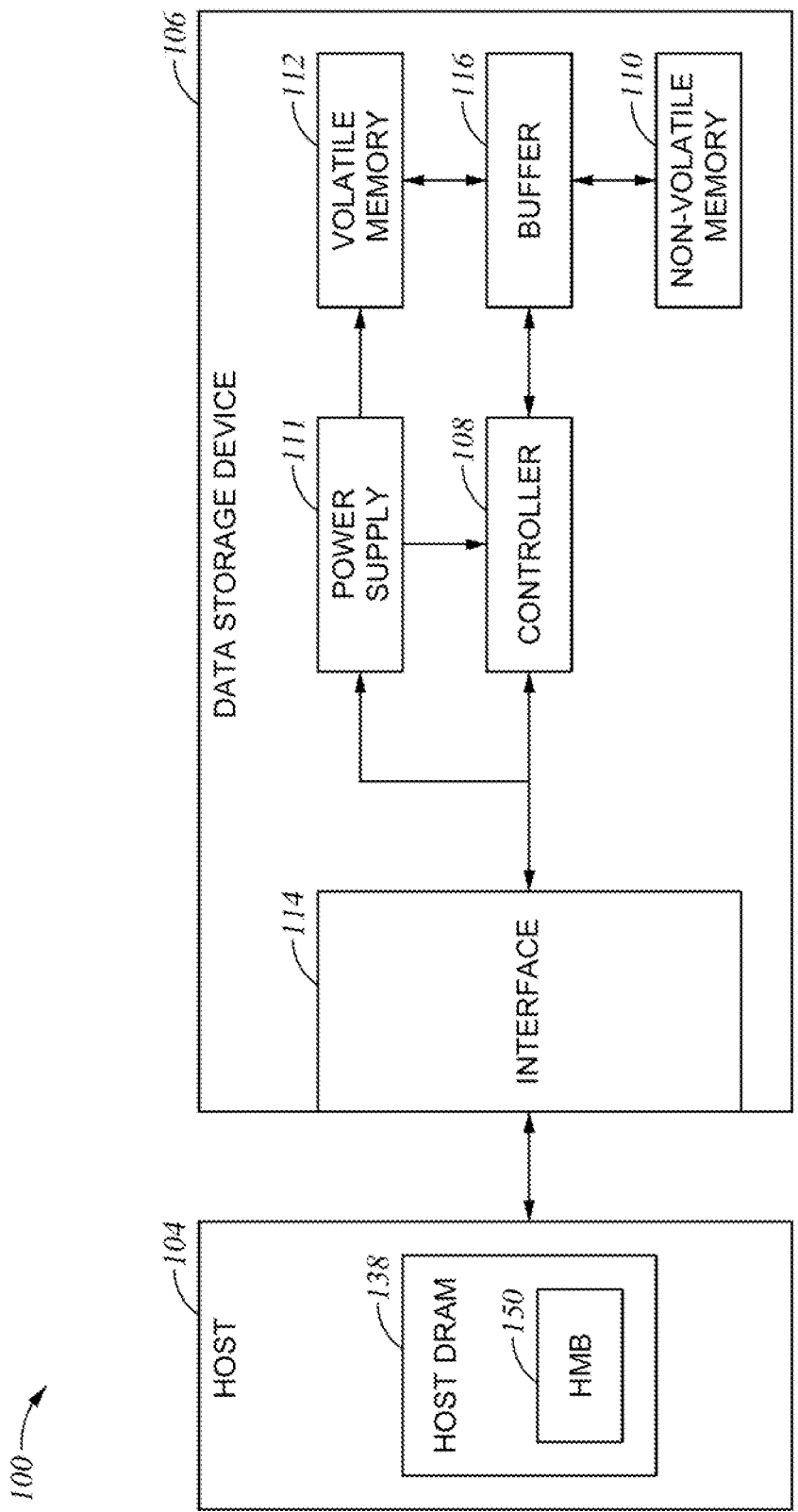
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory), which may be SRAM memory, prior to sending the data to the NVM 110. In some embodiments, the host device 104 has DRAM 138 that includes host memory buffer (HMB) 150 that permits the data storage device 106 to store data therein. In embodiments where HMB 150 is present, the data storage device 106 may or may not have DRAM in the controller 108.

Figure 2:
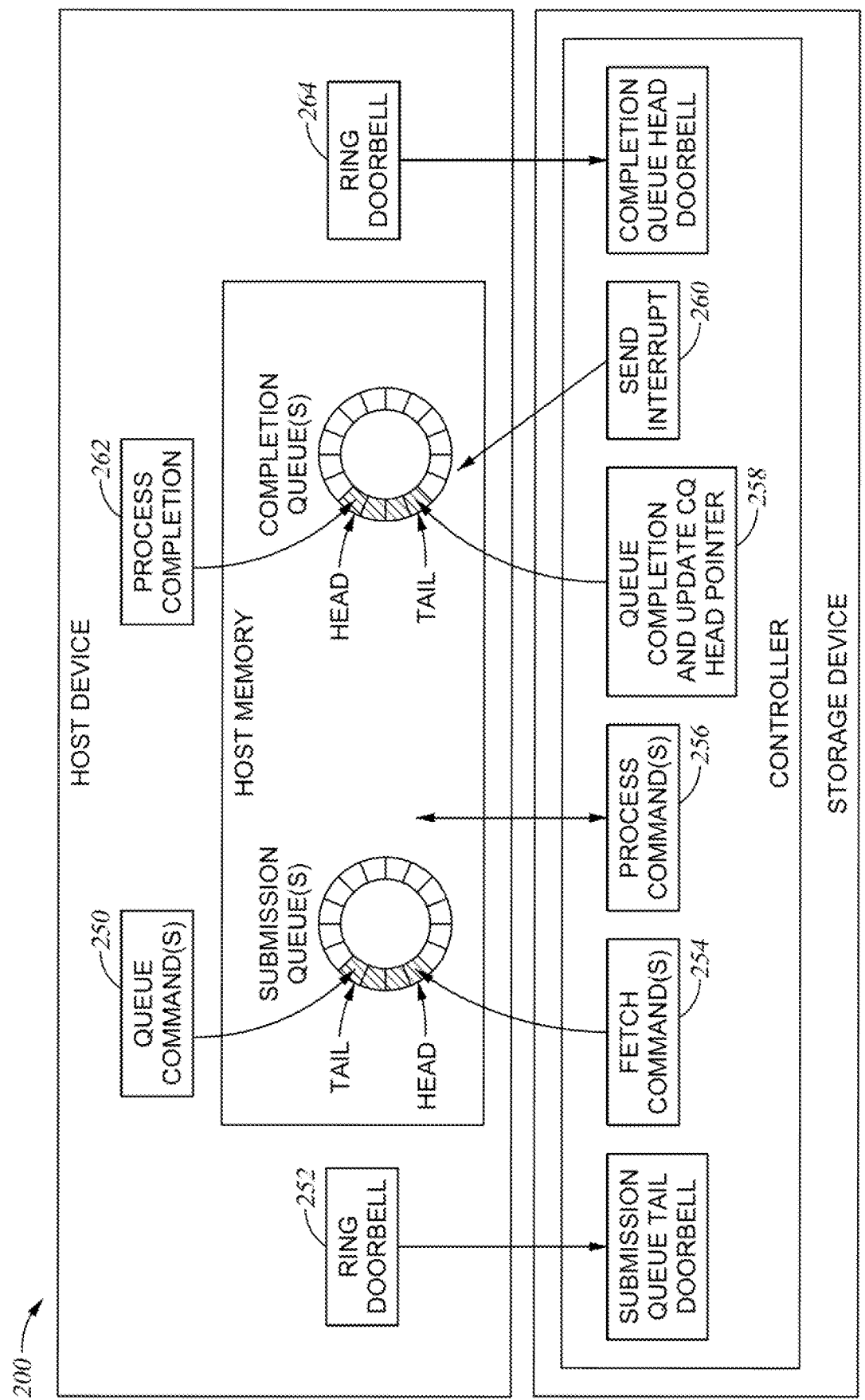
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a SQ as an entry. The host device may write one or more commands into the SQ at operation 250. The commands may be read commands or write commands. The host device may comprise one or more SQs.

In operation 252, the host device writes one or more updated SQ tail pointers and rings a doorbell or sends an interrupt signal to notify or signal the storage device of the new command that is ready to be executed. The host may write an updated SQ tail pointer and send a doorbell or interrupt signal for each of the SQs if there are more than one SQs. In operation 254, in response to receiving the doorbell or interrupt signal, a controller of the storage device fetches the command from the one or more SQs, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the CQ is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
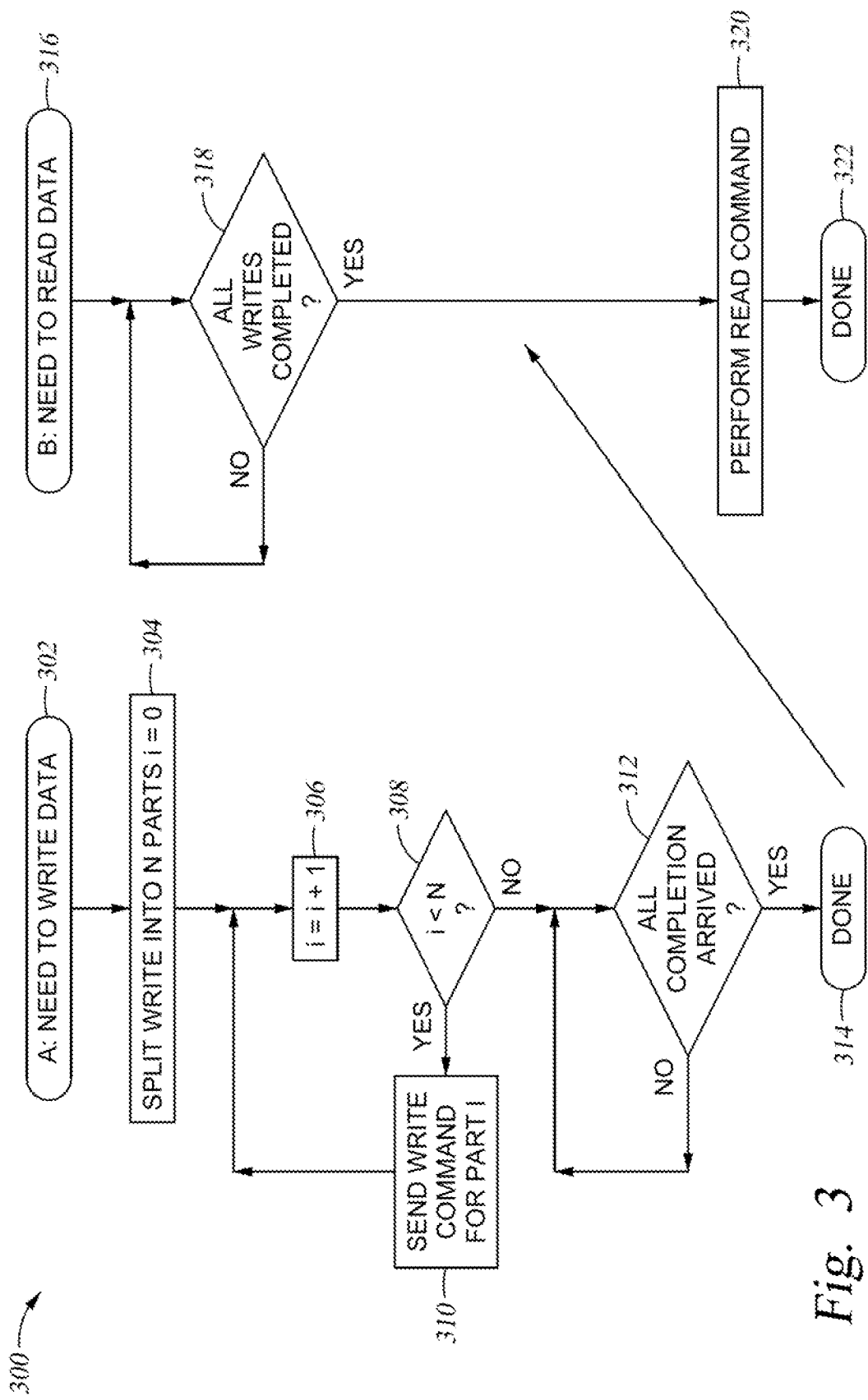
FIG. 3 is a flowchart illustrating a host read after write operation according to one embodiment.

FIG. 3 is a flowchart 300 illustrating a host read after write operation according to one embodiment. For ease of description, the host read after write operation is described in reference to the SSD system 100 although any suitable system may be used.

The flow begins with block 302 when a host 104 needs to write data to the data storage device 106. The controller 108 first splits the write command into multiple smaller writes at block 304, but this does not have to be the case.

Block 306 begins a serial process to check and send each smaller write created at block 304. The controller 108 checks at block 308 to see if all of the small writes have been sent from the total number created at block 304. If the current iteration is less than the total number of parts the write command was broken down into, the flow proceeds from block 308 to block 310, where the next corresponding part of the write command is sent and executed.

Once all parts of the write command have been sent, the flow continues to block 312. Before the host 104 is ensured the write command has completed by writing data in cache 112 or in the NVM 110, the host 104 needs to wait for completion(s) to arrive at block 312. Once all completions have arrived, the write process is finished at block 314.

The second concurrent flow of FIG. 3 starts with block 316, where the host 104 determines that the host 104 needs to read data back from the data storage device 106. To ensure the host 104 receives the most updated data, or in fact atomic data, the host 104 must wait until all write commands in SQs are completed at block 318, not just commands that existed prior to the barrier command. Once all writes are completed, the controller 108 may proceed to block 320 to perform the read command and end the flow at block 322.

The waiting time imposed by the host due to the nature of out of order execution should be reduced. One possible solution is to simply wait for the write commands to complete, which takes time and delays the read operations. Additionally, waiting requires tracking which commands need to complete before performing the read. Another possible solution is to use a flush command, which has a longer wait, but the host device only needs to wait for the flush to complete and does not need to track which commands need to be completed. Neither possible solution effectively reduces the waiting time.

Faster execution of a barrier command is the solution. Taking a snapshot of doorbell states allows the data storage device to quickly complete a barrier command, and, as such, the barrier capability should be added to the NVMe protocol. Using a barrier command will allow the host device to issue a read command as soon as the barrier is approved. Additionally, as will be discussed below, some interface options of the barrier command/approval mechanism will improve the acceleration of execution of pre-barrier commands by analyzing doorbell states.

Figure 4:
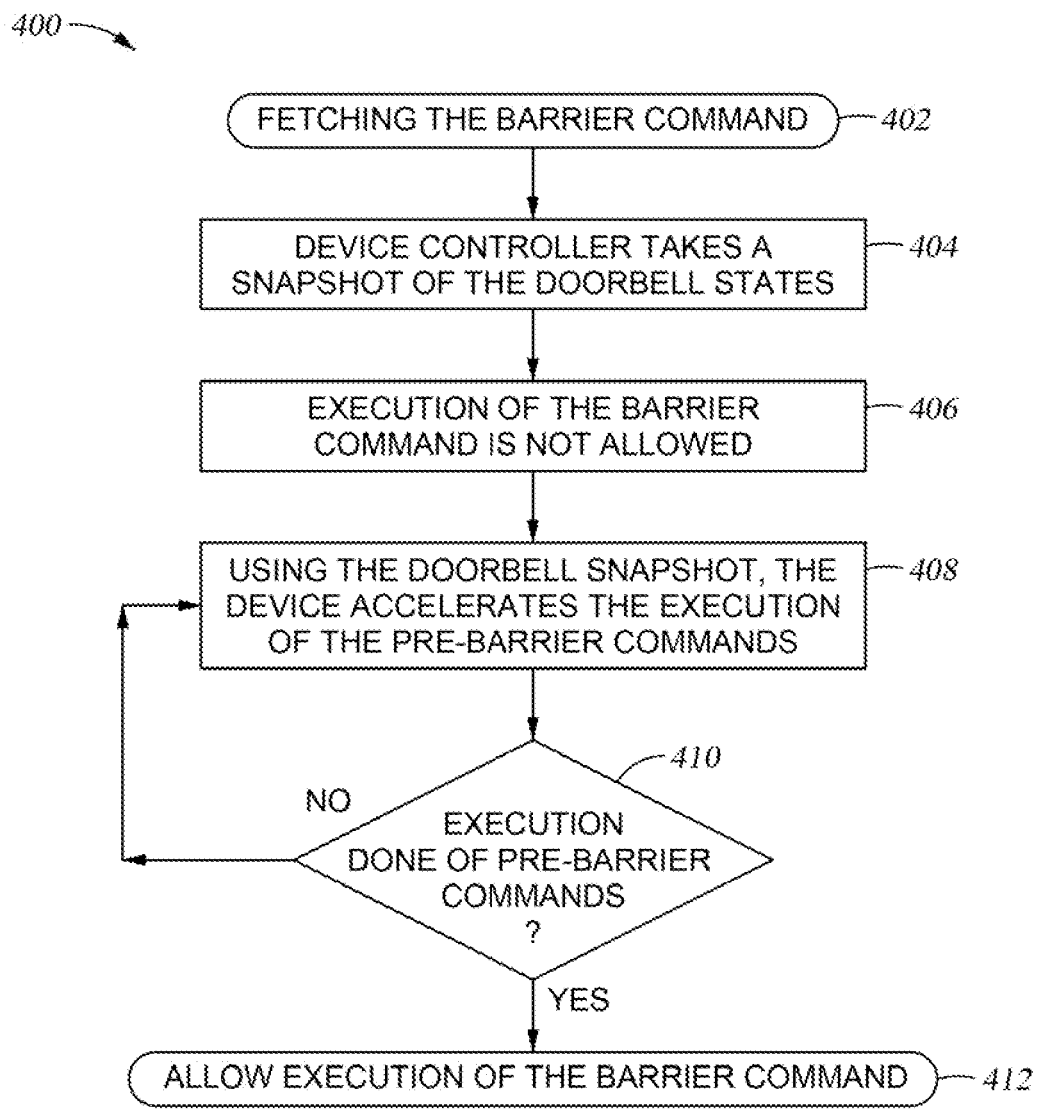
FIG. 4 is a flowchart illustrating implementing a doorbell snapshot within a barrier command operation according to one embodiment.

FIG. 4 is a flowchart 400 illustrating implementing a doorbell snapshot within a barrier command operation according to one embodiment. Starting with block 402, the controller fetches a barrier command. After fetching the barrier command, the controller takes a snapshot of the doorbell states for SQs at block 404. If the barrier command is not allowed to be executed at block 406 then there must be pre-barrier commands in the SQs.

Using the doorbell snapshot, at block 408 the controller identifies the pre-barrier commands and accelerates their execution so the barrier command can be executed faster. The controller proceeds by checking if all of the pre-barrier commands have been executed at block 410. If any pre-barrier commands remain, the flow returns to block 408. If all pre-barrier commands have been executed, the barrier command is executed at block 412, ending the flow. Note that the barrier command acts like a flush in regards that everything after the barrier command is executed after everything before the barrier command. However, the method does not require actual copying of data from the cache to the memory device (e.g., NAND) and thus will allow the host to use the flow discussed below when performing reads and writes.

Figure 5:
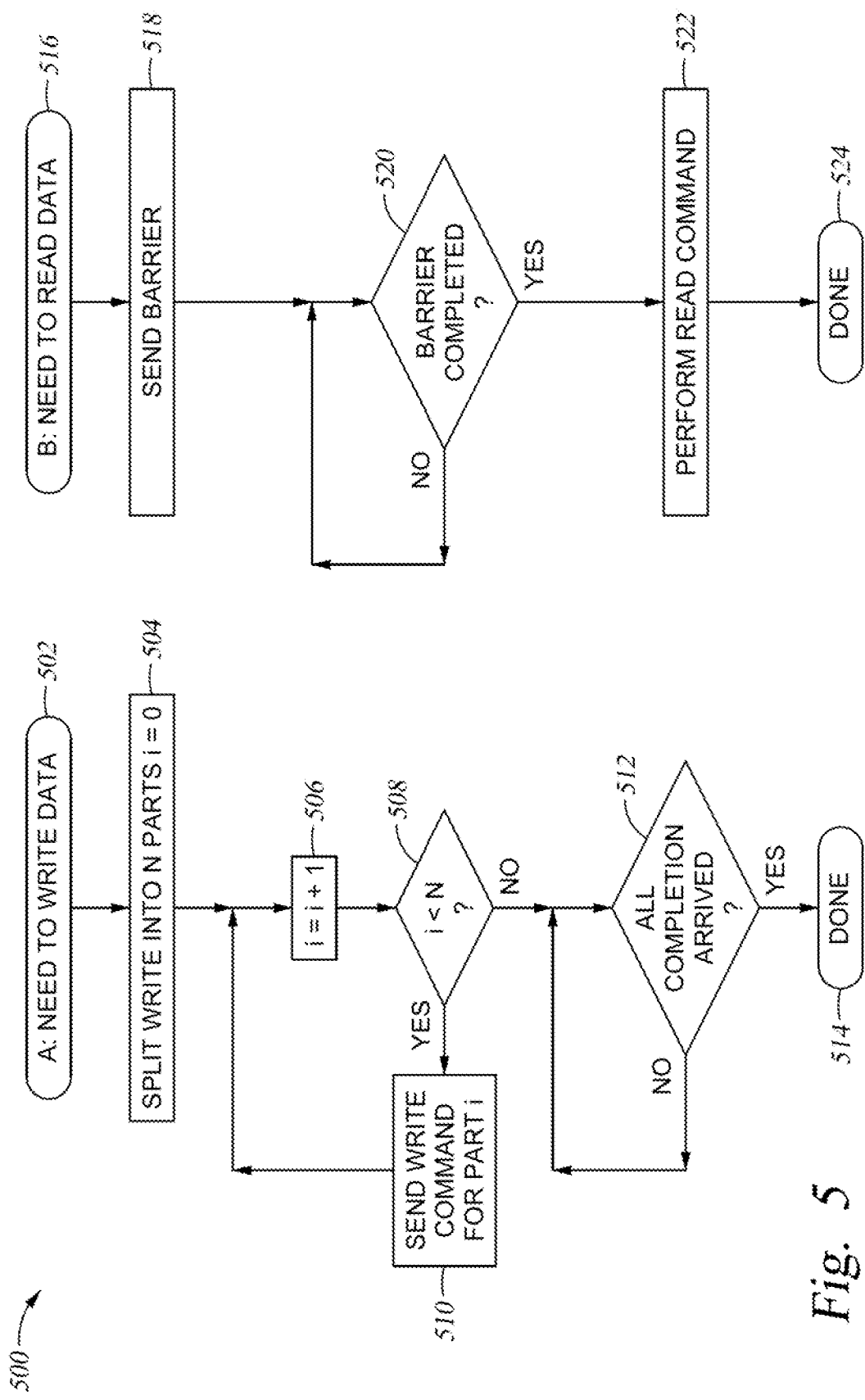
FIG. 5 is a flowchart illustrating a host read after write operation with a barrier command according to one embodiment.

FIG. 5 is a flowchart 500 illustrating a host read after write operation with a barrier command according to one embodiment. For ease of description, the host read after write operation is described in reference to the SSD system 100 although any suitable system may be used. The read is to be handled after writes where order must be ensured utilizing a barrier command.

The flow begins with block 502 when a host 104 needs to write data to the data storage device 106. The controller 108 first splits the write command into multiple smaller writes at block 504, but this does not have to be the case. The controller 108 increments the write parts (i.e., "i") by 1 at 506.

The controller 108 checks at block 508 to see if all of the small writes have been sent from the total number created at block 504. If the current iteration is less than the total number of parts the write command was broken down into, the flow proceeds from block 508 to block 510, where the next corresponding part of the write command is sent and executed.

Before the host 104 is ensured the write command has completed by writing data in cache 112 or in the NVM 110, the host 104 needs to wait for completion(s) to arrive at block 512. Once all completions have arrived, the write process is finished at block 514.

The second concurrent flow of FIG. 5 starts with block 516, where the host 104 determines the host 104 needs to read data back from the data storage device 106. To ensure the host 104 receives the most updated data, the host 104 issues a barrier command at block 518.

The flow proceeds to decision block 520 where the controller 108 checks for completion of the barrier command. One benefit is that the host 104 does not need to track which commands need to be completed before performing the read. The host 104 only needs to wait for the barrier command to finish. Further, the barrier command completion is almost immediate which results in the host 104 not having to stall before performing the read. The barrier command can be executed as soon as the snapshot is taken and used to modify a weighted round robin scheme. Once the barrier command is completed, the flow proceeds to block 522 where the read command is performed and the flow ends with block 524.

Figure 6:
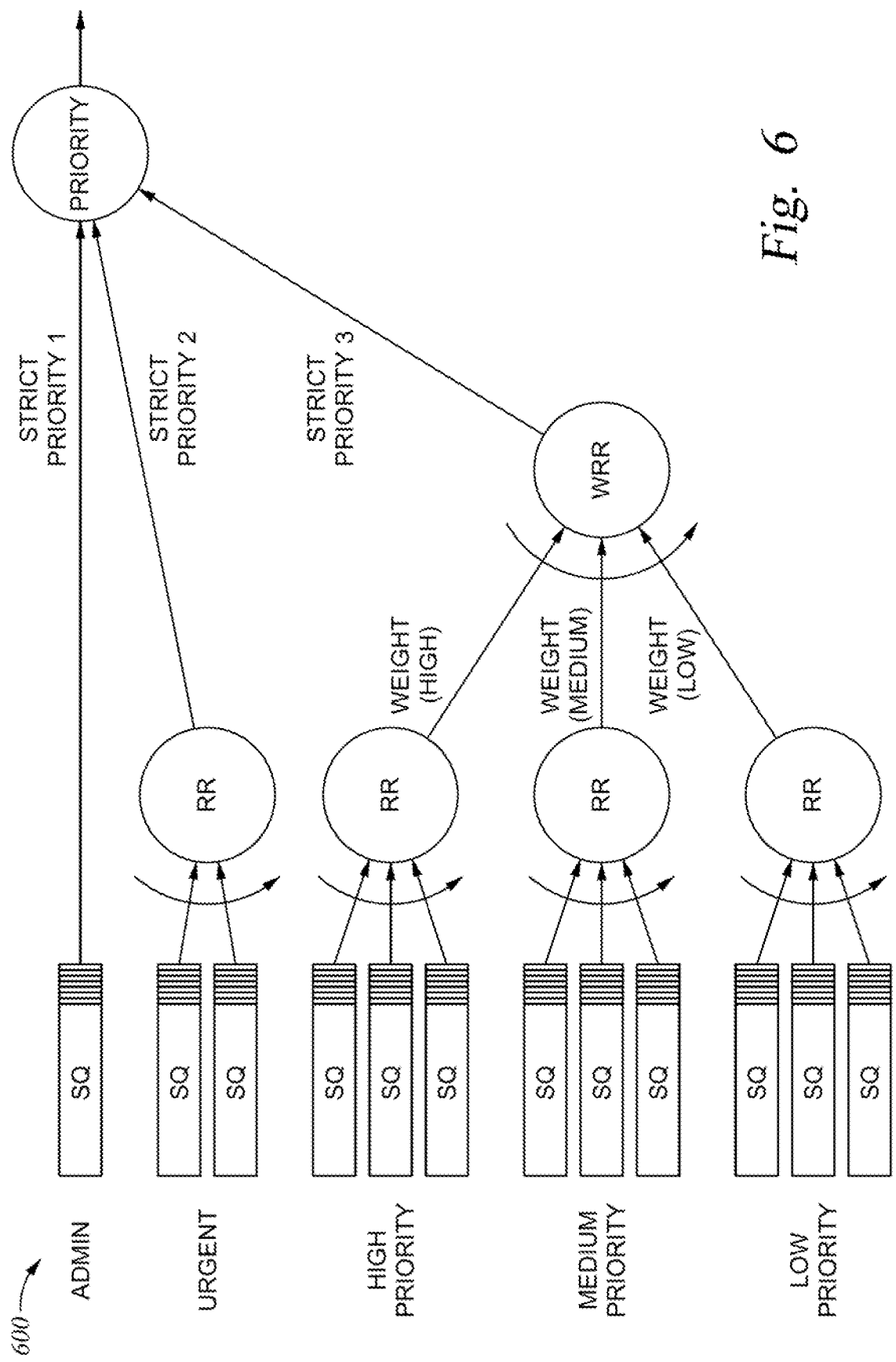
FIG. 6 is an illustration of a weighted round robin arbitration scheme used by the controller according to one embodiment.

FIG. 6 is an illustration of a weighted round robin arbitration scheme 600 used by the controller according to one embodiment. In order for the controller to quickly execute the barrier commands, the barrier command should arrive quickly at the controller. The barrier command can arrive via an administrative queue, for example, which holds higher priority over input/output (I/O) queues. The barrier command may alternatively arrive via a dedicated urgent priority queue or through dedicated registers. Once arrived, the barrier command needs to be executed quickly by having the data storage device controller enforce ordering where commands arriving after the barrier command are executed after commands arriving before the barrier command. In operation, read and write commands arrive and are placed in submission queues (SQs) that are grouped and designated as either high, medium, or low priority. The SQs of each priority grouping undergo a round robin (RR) selection to select a command from each priority grouping.

The command that is selected from each priority grouping RR then undergoes a weighted round robin (WRR) selection. The command selected from the high priority grouping is given a higher weight in the WRR than the medium and low priority grouping commands. This higher weight results in a higher selection rate in the WRR selection.

The selected command from the WRR is then sent to a priority selection. The priority selection checks the priority of any commands that are waiting at the priority selection. Commands from the WRR are given the lowest priority, commands from a SQ grouping labeled urgent are given second level priority, and commands from the admin SQ are given the highest priority. The priority process executes the highest priority command waiting.

Rather than being sent with the regular read and write commands, the barrier commands may be sent via the admin or urgent SQs to be selected faster for execution. A system may also use registers to send barrier commands to bypass the entire queuing mechanism.

Figure 7A:
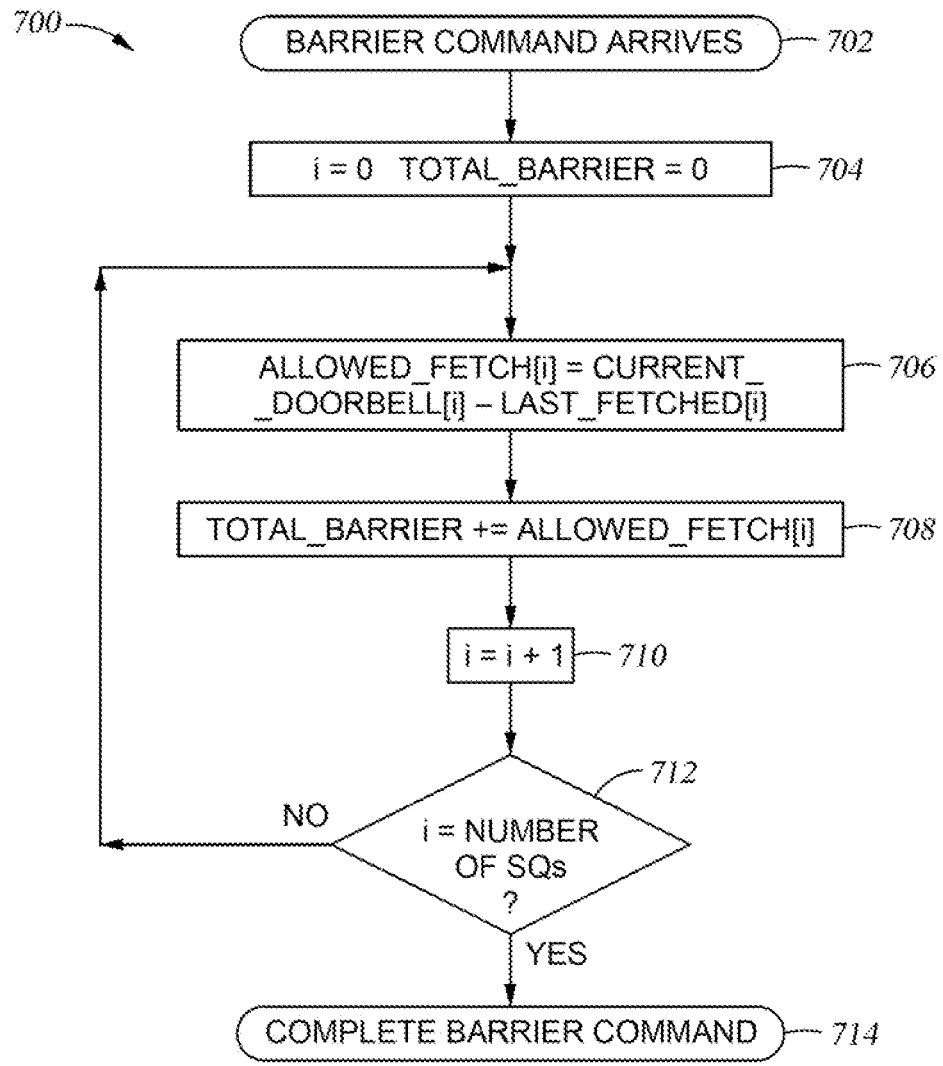
FIGS. 7A and 7B are collectively a flowchart illustrating a quick barrier command support operation according to one embodiment.
Figure 7B:
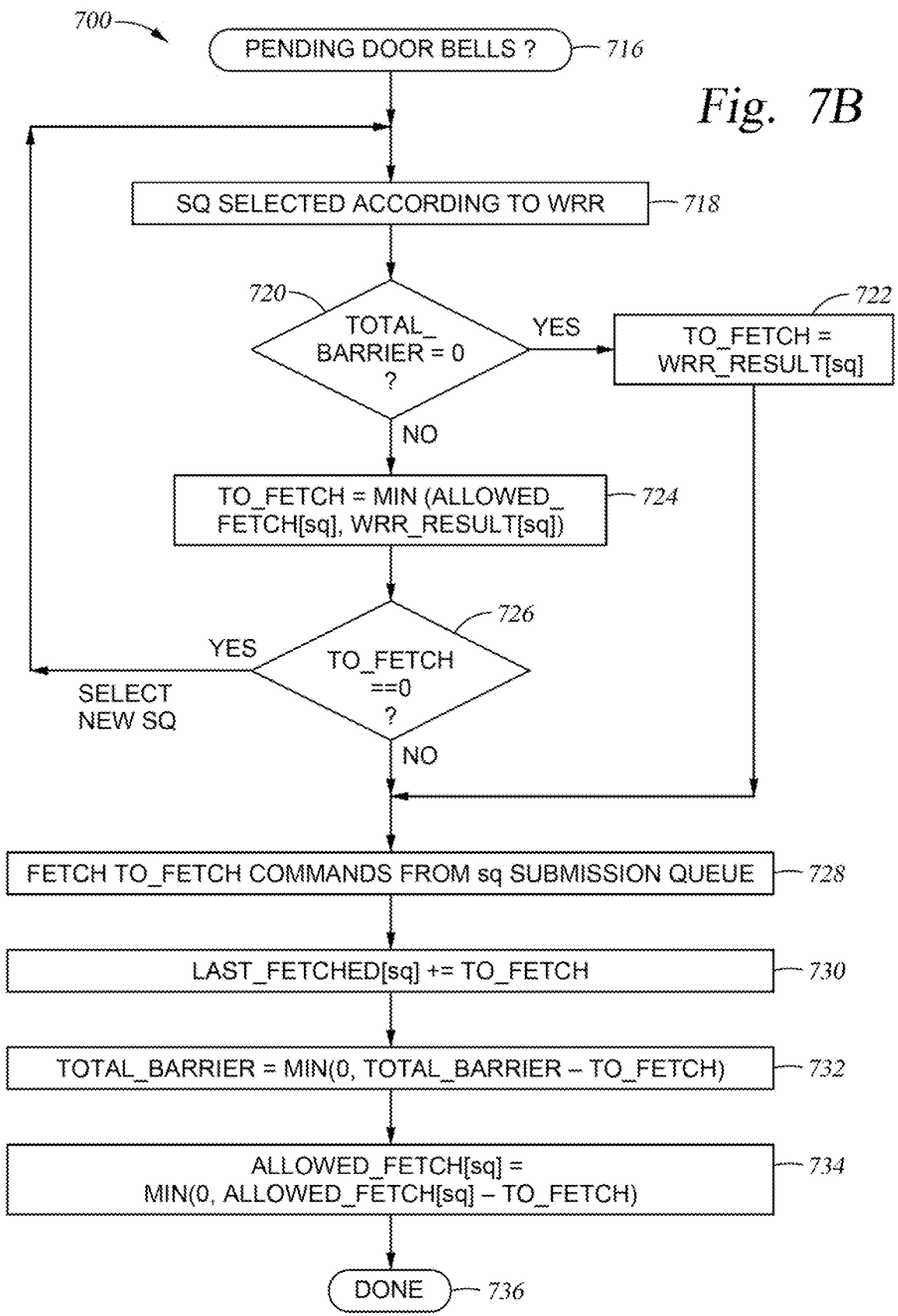

FIGS. 7A and 7B are collectively a flowchart 700 illustrating a quick barrier command support operation according to one embodiment. The first flow begins at block 702 when a barrier command arrives to be executed. At block 704, the controller initializes a first value counter labeled total_barrier to zero, resetting the counter from any prior barrier commands.

The process then proceeds to block 706, where the controller checks the difference between a second value counter labeled as last_fetched and the current doorbell value from the snapshot taken for the SQ. Last_fetched corresponds to the number of commands last fetched from the queue. The difference is stored as a third value counter labeled as allowed_fetch for each SQ. As an example, if a SQ has 8 for a doorbell, but only 4 were fetched, 4 more commands need to be fetched to satisfy the SQ requirement from the barrier command.

The total_barrier counter is incremented by the allowed_fetch value at block 708 to account for the number of commands in the SQ that need to be executed. The controller then increments a counter at block 710 and compares that value to the number of SQs at block 712. If the counter is less than the total number of SQs, the controller returns to block 706 to begin comparing value counters for a different SQ. This process repeats until all SQs have been checked, and the flow can end at block 714 by completing the barrier command.

The second flow begins at block 716, where the controller checks if there are pending doorbells in the SQs. The controller implements the WRR arbitration scheme of FIG. 6 at block 718 to select a SQ to fetch a command from.

The controller checks if the total_barrier command equals 0 at block 720, where equaling 0 means there is no barrier required for the current SQ. Total_barrier equaling 0 leads to block 722 where the controller does not modify the normal results of the WRR and to_fetch is set to the WRR results. If the total_barrier command does not equal 0, then the flow continues to block 724.

At block 724, the controller compares the allowed_fetch value for the current SQ to the WRR result. To_fetch is further limited by the allowed_fetch value (i.e., the number of commands that should be done before the barrier for the selected SQ). The controller checks if to_fetch equals 0, which would mean there are no commands in the current SQ that are needed to be fetched because the SQ cannot be serviced at all. If to_fetch is equal to 0, the flow returns to block 718 where the controller selects a new SQ and continues to select different queues until a valid queue is found. If to_fetch does not equal 0, meaning there are commands in the current SQ that need to be fetched, the flow continues to block 728. The controller then fetches a number of commands equal to to_fetch from the current SQ.

After the commands have been fetched, the internal value counters need to be updated. Total_barrier is updated at block 732 to be a new minimum value between 0 and the difference of total_barrier value and the to_fetch value of the current SQ. Allowed_fetch is updated at block 734 in a similar fashion, where the new value is a minimum value between 0 and the difference of allowed_fetch and to_fetch. The flow then ends at 736 for the current SQ and can restart with selecting a new queue.

It is contemplated that the barrier command can be executed per SQ rather than globally, but it is also contemplated that the barrier command can be executed globally. Multiple barrier commands can be supported where the host device and data storage device communicate as to the number of allowed and active barrier commands. When the total_barrier value for the first barrier command is 0 (i.e., completed), another barrier command can be pushed.

By creating a snapshot of commands that remain to be fetched, when a barrier command is detected, the controller can inform the host device that the barrier command will be enforced, and the host device can continue issuing more commands without the fear of breaking the barrier rules. Thus, read and write operations are accelerated. The snapshot provides the host with fast and easy barrier command emulation so that the host device does not need to stall on flush commands and/or track multiple command completions.

In one embodiment, a data storage device comprises: a memory device; and a controller coupled to the memory device, wherein the controller is configured to: fetch a barrier command; capture a snapshot of doorbell states of pre-barrier commands in at least one submission queue (SQ); inform a host device of completion of the barrier commands; and receive a new command, wherein the new command is to be completed after the pre-barrier commands. The barrier command is executed in relation to a single SQ. The controller is further configured to fetch a plurality barrier commands. The controller is configured to communicate with a host as to a number of allowed and active barrier commands. The plurality of barrier commands are executed in relation to a single SQ per barrier command. The controller is further configured to use a weighted round robin (WRR) arbitration scheme to determine command execution order. Accelerating the execution of pre-barrier commands comprises modifying the WRR arbitration scheme to intentionally select and execute the identified pre-barrier commands in one or more SQs. The one or more barrier commands are delivered via an admin submission queue. The one or more barrier commands are delivered via dedicated registers bypassing queuing. Capturing a snapshot of doorbell states further comprises modifying the WRR arbitration scheme to intentionally select and execute the identified pre-barrier commands by the snapshot in one or more SQs. The controller is further configured to identify the pre-barrier commands, wherein the identifying comprises: fetching a value from a SQ corresponding to the number of commands last fetched; and comparing the number of commands last fetched to the current doorbell value, wherein the difference between the values correspond to the number of commands that are pre-barrier. The controller is further configured to execute pre-barrier commands, wherein the executing comprises executing a number of commands equal to the difference of the current doorbell value and the number of last fetched commands for one or more SQs.

In another embodiment, a data storage device comprises: a memory device; and a controller coupled to the memory device, wherein the controller is configured to: detect one or more barrier commands; initialize a first value counter to 0; capture a snapshot of current doorbell values of pre-barrier commands of one or more submission queues (SQs); determine a difference between a second value counter and the current doorbell value for the one or more submission queues; store the difference as a third value counter; add the third value counter to the first value counter; execute the one or more barrier commands; and inform a host device of barrier command completion. Capturing a snapshot of current doorbell values of pre-barrier commands further comprises altering results from a weighted round robin (WRR) arbitration scheme to execute commands that existed before the one or more barrier commands. The WRR arbitration scheme comprises: one or more low, medium, and high priority submission queues (SQs); one or more urgent SQs, wherein the urgent SQs are given priority over the low, medium, and high priority SQs; and an admin SQ, wherein the admin SQ has the highest priority of SQs. The first value counter is identified as a total barrier counter, wherein the total barrier counter accumulates the number of commands required prior to a barrier command execution for a SQ. The second value counter is identified as last fetched, wherein the last fetched value counter tracks the doorbell value of the last command executed from a SQ. The third value counter is identified as allowed fetch, wherein the allowed fetch value corresponds to the number of commands in a SQ that must be executed before a barrier command.

In another embodiment, a data storage device comprises: memory means; and a controller coupled to the memory means, wherein the controller is configured to: receive one or more barrier commands; capture a snapshot of doorbell states of one or more submission queues (SQs); update value counters in response to the snapshot; modify a weighted round robin (WRR) arbitration scheme to ensure commands in the one or more SQs that arrived before a barrier command of the one or more barrier commands are completed before commands that arrived after a barrier command of the one or more barrier commands; execute the barrier command; and inform a host system of the barrier command completion. The modifying a WRR arbitration scheme further comprises limiting the amount of commands to fetch from a SQ, wherein the amount of commands is determined by the value counters.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
fetch a barrier command;
capture a snapshot of doorbell states of pre-barrier commands in at least one submission queue (SQ);
inform a host device of completion of the barrier command;
receive a new command, wherein the new command is to be completed after the pre-barrier commands; and
use a weighted round robin (WRR) arbitration scheme to determine command execution order, wherein the capturing comprises modifying the WRR arbitration scheme to intentionally select and execute a identified pre-barrier commands by the snapshot in one or more SQs.

2. The data storage device of claim 1, wherein the barrier command is executed in relation to a single SQ.

3. The data storage device of claim 1, wherein the controller is further configured to fetch a plurality of barrier commands.

4. The data storage device of claim 3, wherein the controller is configured to communicate with a host as to a number of allowed and active barrier commands.

5. The data storage device of claim 4, wherein the plurality of barrier commands are executed in relation to a single SQ per barrier command.

6. The data storage device of claim 1, wherein the one or more barrier commands are delivered via an admin submission queue.

7. The data storage device of claim 1, wherein the one or more barrier commands are delivered via dedicated registers bypassing queuing.

8. A data storage device, comprising:
a memory device; and
a controller coupled to the memory device, wherein the controller is configured to:
fetch a barrier command;
capture a snapshot of doorbell states of pre-barrier commands in at least one submission queue (SQ), wherein the capturing comprises storing a value corresponding to a doorbell value from the snapshot, wherein the value is identified as current doorbell;
inform a host device of completion of the barrier command; and
receive a new command, wherein the new command is to be completed after the pre-barrier commands.

9. A data storage device, comprising:
a memory device; and
a controller coupled to the memory device, wherein the controller is configured to:
fetch a barrier command;
capture a snapshot of doorbell states of pre-barrier commands in at least one submission queue (SQ);
inform a host device of completion of the barrier command;
receive a new command, wherein the new command is to be completed after the pre-barrier commands; and
identify the pre-barrier commands, wherein the identifying comprises:
fetching a value from a SQ corresponding to a number of commands last fetched; and
comparing the number of commands last fetched to a current doorbell value, wherein a difference between the values correspond to the number of commands that are pre-barrier.

10. The data storage device of claim 9, wherein the controller is further configured to execute pre-barrier commands, wherein the executing comprises executing a number of commands equal to the difference of the current doorbell value and the number of last fetched commands for one or more SQs.

11. A data storage device, comprising:
a memory device; and
a controller coupled to the memory device, wherein the controller is configured to:

detect one or more barrier commands;
initialize a first value counter to 0, wherein the first value counter corresponds to a number of barrier commands in one or more submission queues (SQs);
capture a snapshot of current doorbell values of pre-barrier commands of the one or more SQs, wherein the capturing comprises storing the current doorbell values;
determine a difference between a second value counter and the current doorbell value for the one or more SQs, wherein the second value counter corresponds to a number of commands last fetched from the one or more SQs;
store the difference as a third value counter;
add the third value counter to the first value counter;
execute the one or more barrier commands; and
inform a host device of barrier command completion.

12. The data storage device of claim 11, wherein capturing a snapshot of current doorbell values of pre-barrier commands further comprises altering results from a weighted round robin (WRR) arbitration scheme to execute commands that existed before the one or more barrier commands.

13. The data storage device of claim 12, wherein the WRR arbitration scheme comprises:
one or more low, medium, and high priority submission queues (SQs);
one or more urgent SQs, wherein the urgent SQs are given priority over the low, medium, and high priority SQs; and
an admin SQ, wherein the admin SQ has the highest priority of SQs.

14. The data storage device of claim 11, wherein the first value counter is identified as a total barrier counter, wherein the total barrier counter accumulates a number of commands required prior to a barrier command execution for a SQ.

15. The data storage device of claim 14, wherein the second value counter is identified as last fetched, wherein the last fetched value counter tracks the doorbell value of the last command executed from a SQ.

16. The data storage device of claim 14, wherein the third value counter is identified as allowed fetch, wherein the allowed fetch value corresponds to the number of commands in a SQ that must be executed before a barrier command.

17. A data storage device, comprising:
memory means; and
a controller coupled to the memory means, wherein the controller is configured to:
receive one or more barrier commands;
capture a snapshot of doorbell states of one or more submission queues (SQs), wherein the capturing comprises storing a current doorbell value of the one or more SQs from the snapshot;
update a value counter in response to the snapshot, wherein the updating comprises storing a difference between a number of commands last fetched from the one or more SQs and the current doorbell value of the one or more SQs;
modify a weighted round robin (WRR) arbitration scheme to ensure commands in the one or more SQs that arrived before a barrier command of the one or more barrier commands are completed before commands that arrived after a barrier command of the one or more barrier commands;
execute the barrier command; and
inform a host system of the barrier command completion.

18. The data storage device of claim 17, wherein the modifying a WRR arbitration scheme further comprises limiting an amount of commands to fetch from a SQ, wherein the amount of commands is determined by the value counters.

* * * * *